May 1, 1934.  G. R. WOOD  1,957,191

MEAT SLICER CLAMP

Filed May 14, 1931

INVENTOR
George R. Wood
BY his ATTORNEY
A. C. Maby

Patented May 1, 1934

1,957,191

UNITED STATES PATENT OFFICE 1,957,191

MEAT SLICER CLAMP

George R. Wood, Toronto, Ontario, Canada, assignor, by mesne assignments, to International Business Machines Corporation, New York, N. Y., a corporation of New York Application May 14, 1931, Serial No. 537,314

11 Claims. (Cl. 146—217)

This case relates to slicing machines and particularly to the clamping features thereof.

The object of the invention is to provide novel means for holding and clamping an article.

Further, the object is to provide novel means for supporting a clamp member and holding it in adjusted position.

Still further, the object is to provide novel means for holding a clamp in position and releasing it for re-adjustment as desired.

Various other objects and advantages of my invention will be obvious from the following particular description of one form of mechanism embodying the invention or from an inspection of the accompanying drawing; and the invention also constitutes certain new and novel features of the construction and combination of parts hereinafter set forth and claimed.

Figure 1:
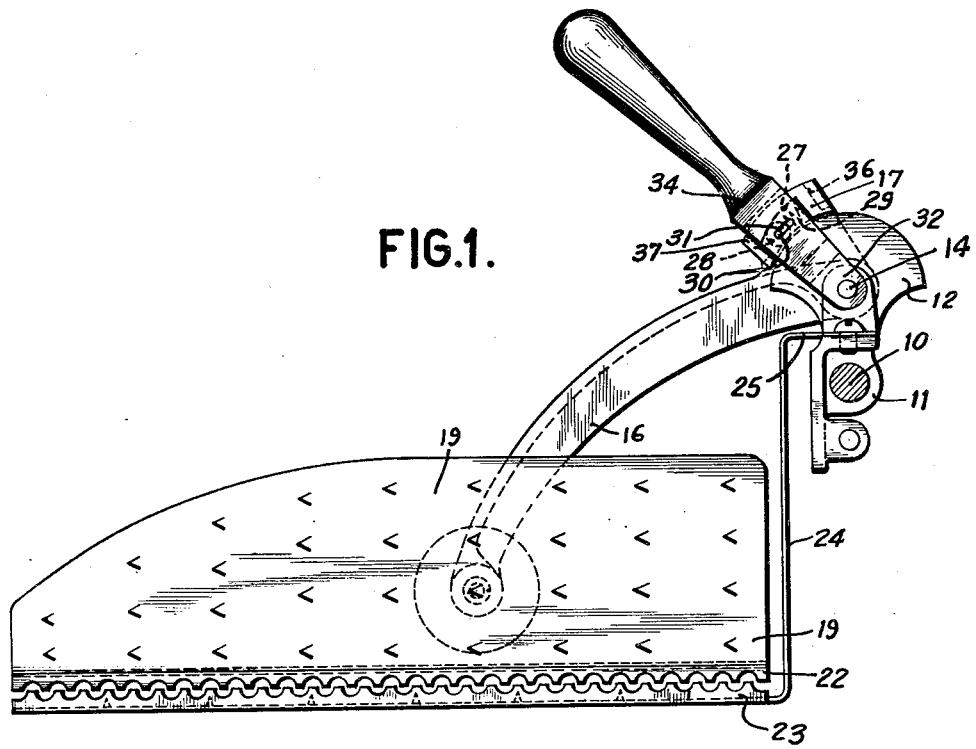
Fig. 1 is a side view of the clamp device.
Figure 2:
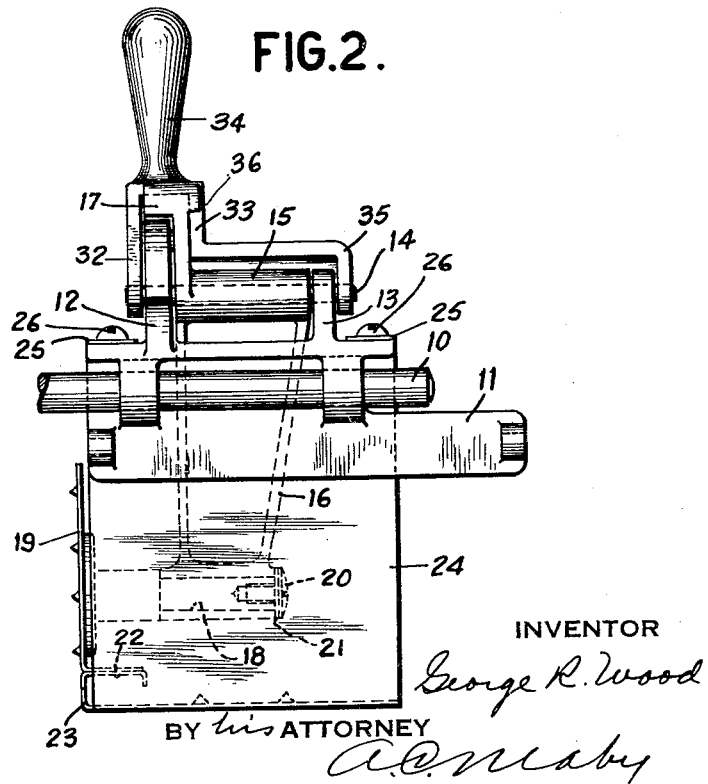
Fig. 2 is an end view of the clamp device from the right side of Fig. 1.

In detail, the slicing machine has a round rail 10 on which is rotatably and slidably supported a clamp frame or bracket 11. The latter has a pair of spaced upstanding lugs 12 and 13 through which is passed a rod 14. Journaled on this rod between the lugs 12 and 13 is the sleeved portion 15 of a clamp arm 16. The sleeved portion 15 continues upwardly at the side adjacent lug 12 and then has an arcuate portion 17 extending concentrically over the arcuate periphery of lug 12. The lower edge of portion 17 has the same curvature as the arcuate periphery of lug 12 and is closely adjacent the periphery. Arm 16 at its lower end is sleeved to receive a rod 18 carrying a clamp 19.

The rod 18 is rotatable within the sleeve of arm 16 but is frictionally retained against movement relative to the arm by means of a screw 20 and spring washer 21. The side of clamp 19 serves as a pusher plate while the lower end carries a horizontally extending notched plate 22 forming teeth between which and similarly formed teeth in a plate 23, an article may be clamped. Plate 23 is integral with a vertical portion 24 having at its upper end horizontal lugs 25 attached by screws 26 to a ledge on clamp bracket 11.

The arcuate portion 17 is provided with a wedge-shaped slot 27 open at its lower end opposite the arc-shaped top of lug 12. In slot 27 is a roller 28 normally urged to the narrower end of the slot by a coil spring 29. The roller 28 rides on the arcuate periphery of lug 12. The clamp is free to move down because in so doing the wider portion of slot 27 tends to move over roller 28. The clamp, however, cannot normally move upward because then the narrower portion of slot 27 tends to move over roller 28 and the latter is thereby wedged between the upper wall of slot 27 and the top of lug 12.

Extending from each side of roller 28 are trunnions 30 received in elongated slots 31 formed in the furcations 32 and 33 of a handle member 34. The furcations 32 and 33 straddle the lug 12 and the portion 17 of clamp arm 16. Furcation 32 and extension 35 of furcation 33 receive the ends of rod 14 to journal the handle member on the rod. The handle member 34 may move between side-wise extensions 36 and 37 of portion 17 which engage furcation 33 to stop the handle member. When the latter is swung clockwise as viewed in Fig. 1, the left hand ends of elongated slots 31 contact trunnions 30 and against resistance of spring 29 move the roller 28 towards the wider portion of slot 27. This unclutches the clamp arm 16 from the lug 12 and the clamp parts carried by arm 16 may then be moved away from clamp plate 23.

Such movement of clamp arm 16 may be effected by handle member 34 which at the end of its movement for releasing roller 28 from clutching position contacts extension 36 so that continuation of movement of member 34 in the same direction will carry along the clamp arm 16.

To move the clamp 22 towards clamp plate 23, handle 34 may be moved counterclockwise as viewed in Fig. 1 and through contact with extension 37 of clamp arm 16 it will move the latter and its parts in the same direction and towards plate 23.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In combination, a clamp, a handle for manipulating the clamp, a support, a pivotal connection between the clamp and support for constraining the clamp to pivotal movement on the support, retaining means intermediate the support and clamp for retaining the clamp against such pivotal movement in one direction, a pivotal connection directly between the handle and support for pivotally mounting the handle on the support separately from the clamp and the first-mentioned connection, abutting portions on the clamp and handle for limiting pivotal movement of the handle relative to the clamp and means carried by the handle for releasing the retaining means while the handle is rocking relative to the clamp and prior to interengagement of the abutting portions.

2. In combination, a clamp for engaging an article, a device relative to which the clamp is movable, a handle, a direct connection between the handle and said device for mounting the handle on the device separately from the clamp, the handle having a limited reciprocation relative to the clamp towards and away from the article and having means engaging the clamp at opposite ends of said reciprocation for moving the clamp towards and away from the article in the same direction of movement as the handle, and retaining means between the device and clamp for retaining the clamp against movement relative to the device in a direction away from the article and released by the handle during movement of the latter relative to the clamp in a direction away from the article to release the clamp for movement by said handle means in the latter direction.

3. In combination, a clamp, a device relative to which the clamp is pivotally movable, the device being provided with a member having an arcuate edge, the clamp having a portion movable about the arcuate edge, a wedge-shaped slot in the aforesaid portion open adjacent the arcuate edge, a rotatable element within said slot and riding on the arcuate edge, means for normally holding the element in wedging position between the arc-shaped edge and the opposite wall of the slot to thereby normally prevent movement of the clamp in one direction, and a device for releasing the rotatable element from wedging position.

4. In combination, a support, a frame slidable along said support, a lower clamp device having vertical and horizontal portions, the horizontal portion adapted to underlie an article, the vertical portion being secured adjacent the upper end thereof to the frame, an upper clamp cooperable with the horizontal portion of the device and movably mounted on the frame, the lower clamp device being removable from the frame independently of the upper clamp, means for normally retaining the clamp against movement on the frame, and means for releasing the retaining means.

5. In combination, a clamp, a support arm therefor, a bracket having means for pivotally carrying said support arm, a member rigid on the bracket having a curved edge, means between the support arm and the curved edge for retaining the clamp against movement in one direction, and a device rotatable concentrically with the clamp support arm and relatively thereto for releasing the retaining means.

6. In combination, a clamp having a support arm extending to one side thereof, a frame for pivotally mounting the free end of the support arm, means between the free end of the support arm and the frame movable relative to the arm in the direction of movement of said arm for retaining the support against movement in one direction, and means pivoted to the frame for releasing the retaining means.

7. In combination, a clamp having a support arm extending to one side thereof, a frame for pivotally mounting the free end of the support arm, means between the arm and frame for retaining the support against movement in one direction, and means pivoted to the frame for releasing the retaining means, said last-named means comprising a handle adapted to move the clamp support transversely to an article engaged by the clamp after releasing the retaining means.

8. In combination, a support, a clamp thereon having spaced stop portions, a member movable between the stop portions and engageable with one stop portion for moving the clamp in one direction relative to the support and engageable with the other stop portion for moving the clamp in opposite direction, and clamp retaining means operated by said member during a movement between the stop portions.

9. In a combination such as described in claim 8, said member being a handle pivotally mounted on the support.

10. In a combination such as described in claim 8, the clamp being pivoted to the support.

11. In combination, a support, a guide along which the support is freely movable, a clamp movably carried by the support, wedging means for normally preventing movement of the clamp relative to the support in one direction, a device for constantly urging the wedging means into effective position, and means for counteracting the action of said device to release the clamp for movement.

GEORGE R. WOOD.